Oct. 14, 1947.  D. A. SANDERS ET AL  2,428,855
APPARATUS FOR REMOVING FRUIT AND THE LIKE FROM
A TRAY ON WHICH THE FRUIT IS PROCESSED
Filed July 31, 1947  3 Sheets-Sheet 2
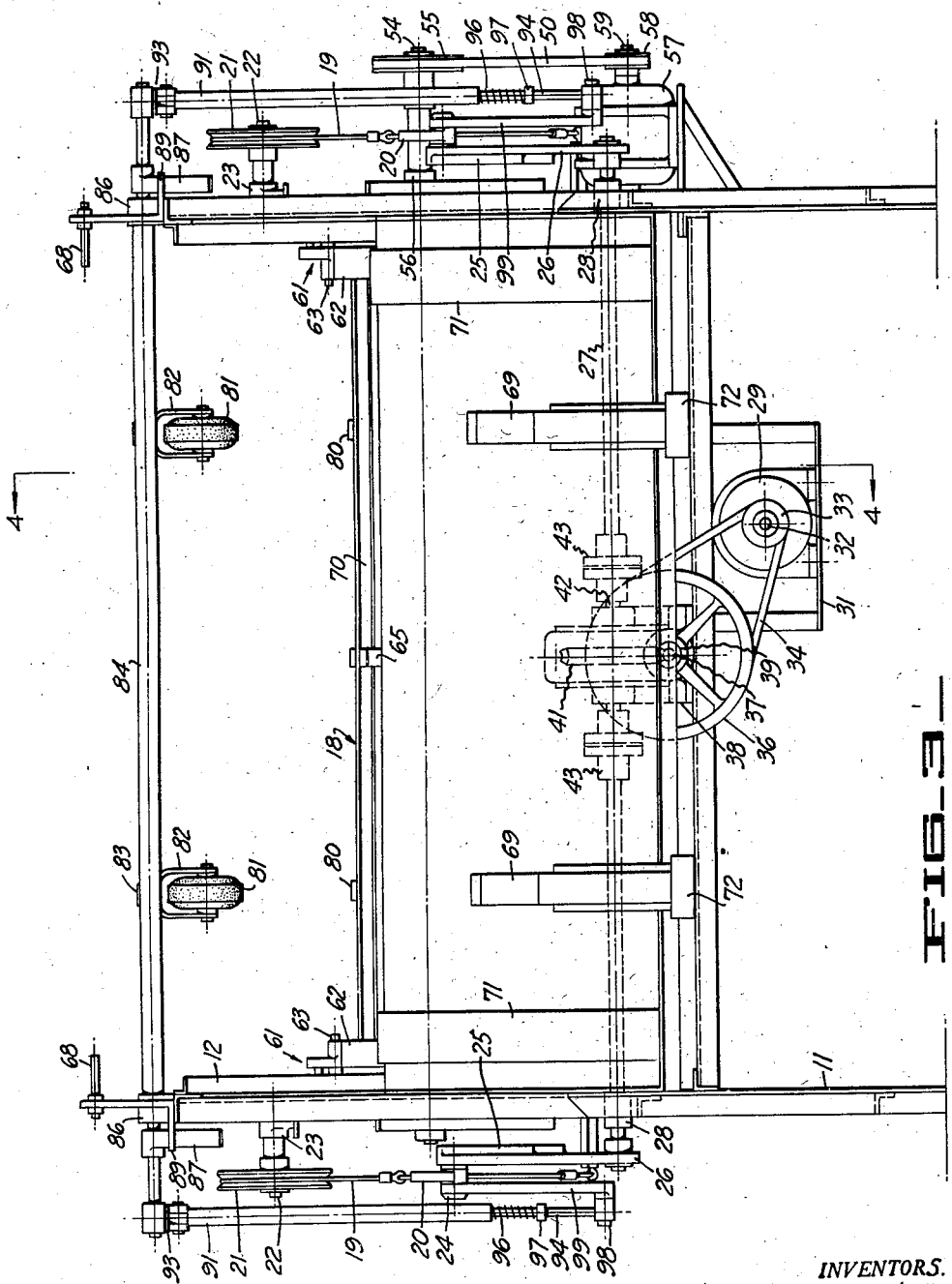
INVENTORS.
David A. Sanders &
Gerhard K. Schrader.
BY
ATTORNEY

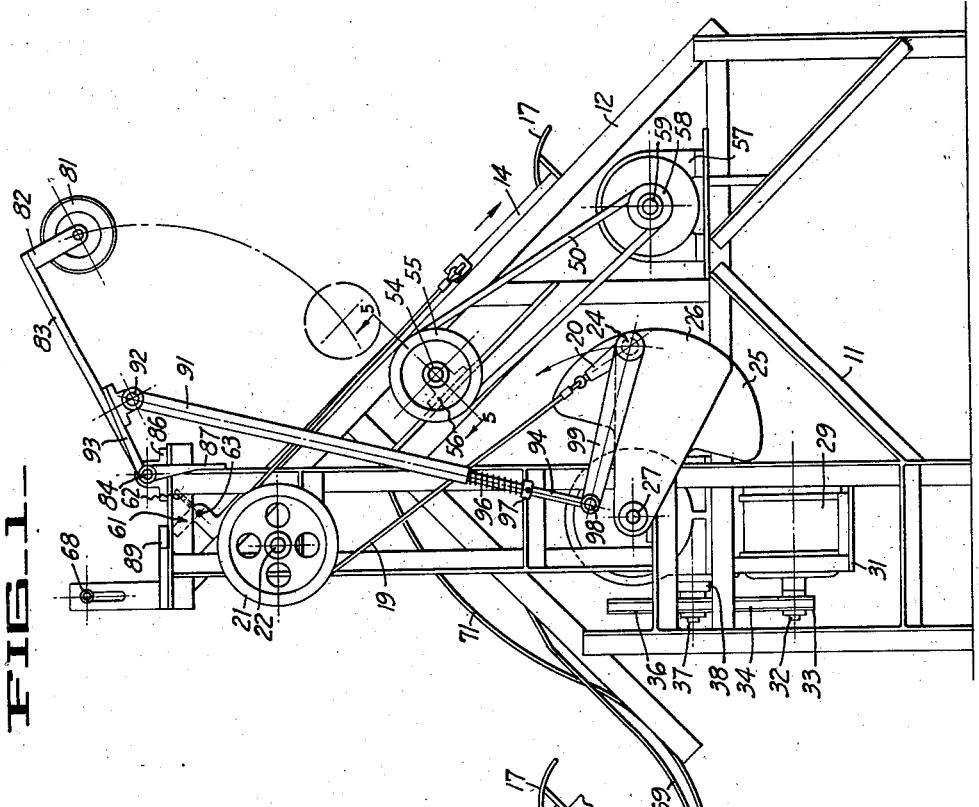

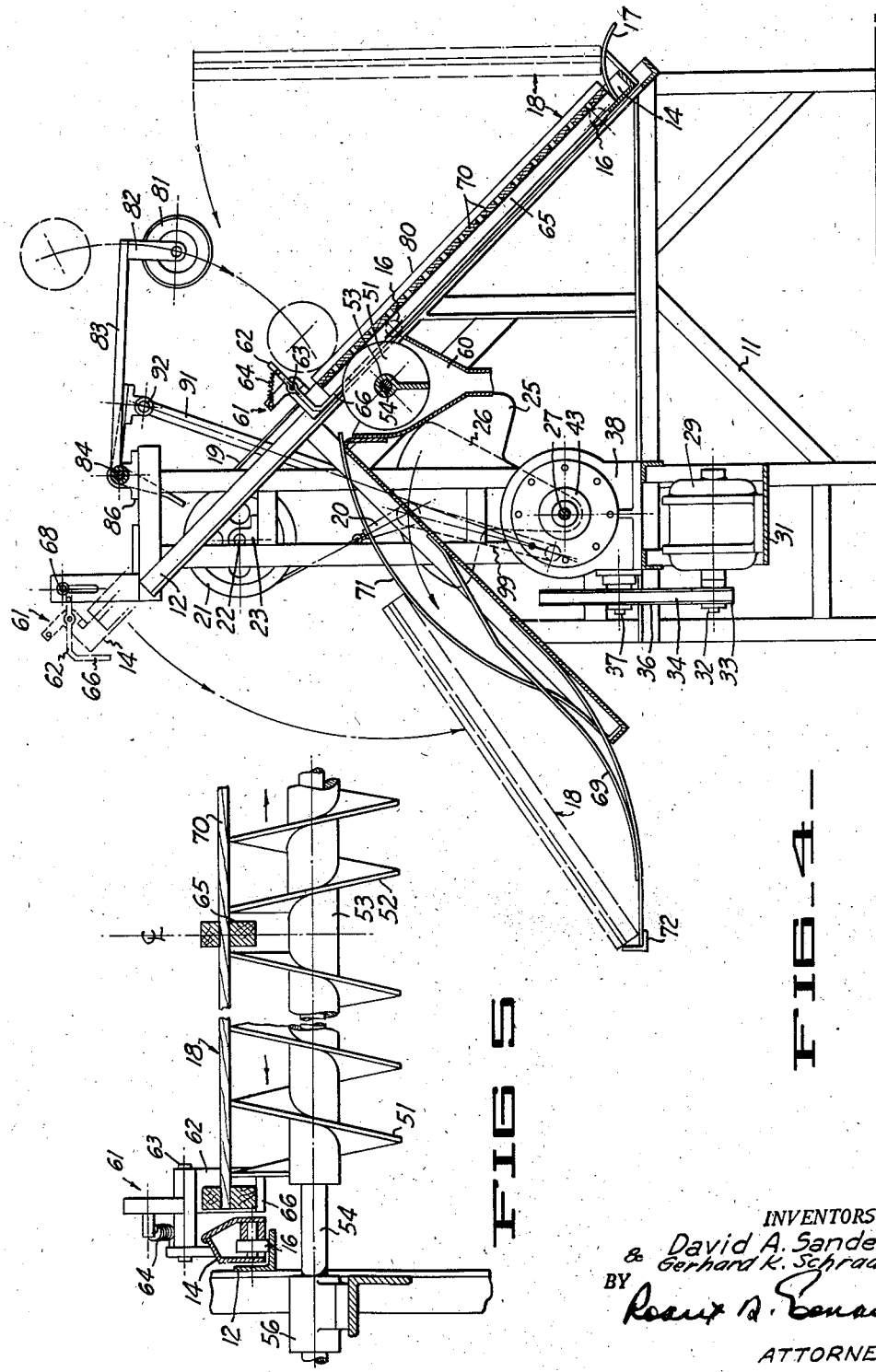

Patented Oct. 14, 1947

2,428,855

UNITED STATES PATENT OFFICE 2,428,855

APPARATUS FOR REMOVING FRUIT AND THE LIKE FROM A TRAY ON WHICH THE FRUIT IS PROCESSED

David A. Sanders and Gerhard K. Schrader, Campbell, Calif.

Application July 31, 1947, Serial No. 765,178

9 Claims. (Cl. 15—93)

1

This invention relates to an improved device for removing dried fruit and the like from trays upon which the fruit has been processed. In the preparation of various materials, it is usual to dispose the material upon trays or like flat structures for support during a processing operation. For example, in the removal of water from prunes, apricots and the like, it is usual to dispose the fruit upon trays which are then subject to a drying atmosphere so that the fruit on the tray is reduced in weight and volume due to the removal of water and, because of the consequent increase in relative sugar content, is rendered less susceptible to deterioration.

While the invention will be particularly described as it has been applied to the successful handling of trays utilized in fruit drying, it is to be understood that the invention is not limited to this and that it may be applied to the handling of trays for various other commodities.

After the trays carrying the fruit have been passed through the evaporator, it is necessary to remove the fruit from the trays. While the majority of the fruit will fall from the trays freely when the tray is tipped or inverted, a considerable portion of the fruit continues to adhere to the tray and it has been necessary heretofore to scrape the trays by hand with scrapers or knives to separate the fruit and prepare the trays for re-use. This operation has been a time-consuming, tedious one, performed only at a relatively high labor cost.

In accordance with the present invention, we provide a machine which is adapted to receive a fully loaded tray as it is derived from the evaporating operation and to process the tray to the end that all fruit, including that adhering to the tray, is removed. It is only necessary to place each fully loaded tray in the machine of the present invention and to take away the clean, empty tray. Thus, the labor cost is reduced to a minimum. In addition, skilled labor is not required, it only being necessary for a sufficient number of persons to be employed to place the loaded trays in position in the machine and to remove the clean, empty trays.

It is in general the broad object of the present invention to provide a novel machine of the class described for receiving trays and for removing from the trays any fruit or other articles adhering to a tray surface.

The invention includes other objects and features of advantage, some of which, together with the foregoing, will appear hereinafter wherein the present preferred form of machine of this invention, as now known to us, is disclosed.

In the drawings accompanying and forming a part hereof, Figure 1 is a side elevation showing the machine of the present invention returning to loading position.

Figure 2 is a side elevation of the machine as shown in Figure 1 but with the various parts thereof in that position corresponding to movement of a tray through the machine and at a halfway point in its travel.

Figure 3 is a rear view of the machine shown in Figure 1.

Figure 4 is a section taken along the line 4—4 of Figure 3.

Figure 5 is a section taken along the line 5—5 in Figure 1.

The machine of the present invention comprises a suitable base or frame structure generally indicated by numeral 11 and made up of suitable structural elements. A track or guide 12 is provided on opposite sides of the frame, being suitably supported, preferably at an angle of less than 90° to the horizontal; in the machine depicted, the tracks are at an angle of 45°. A carriage 14 is slidably mounted upon tracks 12 by rollers 16. Arcuate guides 17 are provided at each lower corner of the carriage 14 for engagement with one end of the tray, the latter being generally indicated by numeral 18.

Means are provided for moving the carriage back and forth along tracks 12 between a first and a second position, this means comprising two flexible cable elements 19 attached to each side of the carriage and each trained about a sheave 21. Each sheave (Figure 3) is rotatably mounted upon a stub shaft 22 carried on a fixed support 23 on frame 11. The other end of each flexible cable element is secured to a link 20 pivoted upon a stub shaft 24 secured to crank arm 26. To offset the weight of the carriage, arms 26 include suitable counterweights 25. Each crank arm 26 is mounted on an end of a shaft 27, one end of which is rotatably mounted in a journal 28 provided on frame 11. Shafts 27 are driven by a prime mover 29 carried upon a sub-frame 31 mounted on frame 11. Prime mover shaft 32 includes a pulley 33 about which is trained a belt 34, the latter being extended about a pulley 36 mounted upon a shaft 37 carried in journals 38. Shaft 37 includes a worm 39 enmeshed with a worm-wheel 41 carried upon a shaft 42, this shaft being joined by couplings 43 to each shaft 27 to rotate them counterclockwise (Figures 1 and 4).

Movement of the carriage is effective to move a tray past suitable means for removing fruit which adheres to the surface of the tray. In the form of device illustrated, the means for removing the adhering fruit is depicted as screw-shaped scrapers 51 and 52; knives, brushes or other abrading means can be employed. Screw shaped scrapers are preferred since they are positive in action, are easily cleaned and do not mar or cut the wooden trays. Each scraper is mounted upon a tube 53 which is carried for rotation by a shaft 54. Scrapers 51 and 52 are preferably formed so that they move the fruit in opposite directions and into a chute 60 when shaft 54 is rotated in a clockwise direction in Figures 1 and 4. Shaft 54, mounted in suitable journals 56 on frame 11, is rotated by electric motor 57, a sheave 58 being provided upon the motor shaft 59 and a belt 50 is trained about the sheave 58 and about a sheave 55 on shaft 54. The scrapers 51 and 52 terminate spaced apart to permit the tray brace member 65 to pass between them.

Referring particularly to Figure 4, we have shown a tray 18 in position between the arcuate support 17 at each lower edge of the carriage and support means generally indicated at 61 and provided on opposite sides at each upper end of the carriage. Support means 61 comprise bell cranks 62 pivotally mounted as at 63 on the carriage and biased by spring 64 toward that position in which the support means are shown in Figure 4 and wherein extending fingers 66 support the upper edge of each tray. The support means retain each tray in the position shown in Figure 4 until the carriage is moved up into the dotted line position of Figure 4 whereupon the extending end 66 of each bell crank engages fixed stop 68 and the bell crank is rocked about the pivot 63 into that position in which it appears in dotted lines in Figure 4. When this occurs, the upper end of the tray is free and the tray drops, along the path indicated by the arrow in Figure 4, to fall upon the several spring supports generally indicated by numerals 69 and 71 and to finally come to rest against stop 72 for removal by an operator.

Means are also provided for retaining each tray in abrading engagement with the fruit removal means. In the form of device shown, this means comprises the wheels 81 rotatably mounted in forks 82 carried upon levers 83 attached to cross shaft 84 which is in turn mounted in suitable journals 86. A lever 87 is mounted upon each end of shaft 84 to engage a stop 89 on each side of the frame and so limit the downward travel of the wheels. To raise and lower the wheels, a tubular link 91 is hinged at 92 on a lever 93 secured to each end of shaft 84. A rod 94 is slidably mounted in each tubular link, a spring 96 being mounted between a collar 97 on rod 94 and the end of the tubular link 91 to provide a flexible connection between the wheels and their lifting mechanism so the wheels can rest against the underside of each tray and apply a desired bias even though the trays vary in thickness. The other end of each rod 94 is hinged as at 98 upon a lever 99, the latter being secured to stub-shaft 24, as by welding, in the position shown in Figure 2.

In operation, with shaft 27 and shaft 54 constantly rotated, carriage 14 is reciprocated on tracks 12. As the carriage nears the bottom of its downward travel, a tray 18 is picked up, preferably by an operator standing on each side of the machine. As the carriage approaches its lower position, the lower edge of the tray is engaged with the arcuate supports 17, as appears in dotted lines in Figure 4; the tray is then pushed forward into that position in which it appears in Figure 4. All loosely adhering fruit will drop from the tray through frame 11 and onto a suitable conveyor (not shown) positioned between the frame members. That fruit which adheres to the tray is quickly removed as the tray is advanced upwardly along tracks 12 and over the scrapers 51 and 52, the fruit being discharged into hopper structure 60 and thence onto the conveyor which removes all of the fruit. At about the time the carriage commences its upward travel, wheels 81 drop into position and ride along suitable rib supports 80 provided upon each tray to retain the tray in engagement with the scrapers 51 and 52, the wheels dropping approximately into that position shown in dotted lines in Figure 4 and wherein they are almost directly superimposed over the scrapers.

When the carriage reaches its uppermost position, the support means 61 are operated to release the upper corners of the tray. Since the tray has then advanced to a point whereat the lowermost edge has passed into substantial abrading abutment with the scrapers, the tray is released to drop over along the path indicated by the arrow in Figure 4 and to come to rest upon springs 69 and 71 and finally against stop 72 from which position it can be readily removed.

We claim:

1. In a device of the character described, a tray support carriage movable back and forth over a path, means for reciprocating said carriage, means for abrading a tray surface during movement of said carriage over said path in one direction, means for holding a tray on the carriage and against the abrading means, and means for releasing a tray from said carriage at a predetermined point along said path.

2. In a device of the character described, a tray support carriage movable back and forth over a path, means for reciprocating said carriage, means positioned for brading a tray surface during movement of said carriage over said path and releasable means for permitting a tray to drop from said carriage at a predetermined point along said path.

3. In a device of the character described, a tray support carriage movable back and forth over a path, means for reciprocating said carriage, means for abrading a tray surface during movement of said carriage over said path, means effective to engage another tray surface to force a tray on the carriage to engage said abrading means during movement of the carriage from one extreme position to another extreme position, and means for releasing a tray from said carriage at a predetermined point along said path.

4. In a device of the character described, opposite tracks positioned at an angle to the horizontal, a tray support carriage slidable on said tracks, means for reciprocating said carriage on said tracks, a screw-shaper scraper extending horizontally and cooperatively adjacent to said carriage to engage a tray thereon, and means for rotating said screw-shaped scraper to remove foreign material from the tray surface during movement of a tray by the carriage.

5. In a device of the character described, opposite tracks positioned at an angle to the horizontal, a tray support carriage slidable on said tracks, means for reciprocating said carriage on said tracks, a rotary scraper extending horizontally and cooperatively adjacent to said carriage to engage a tray thereon, means for retaining a tray on said carriage in engagement with said scraper, and means for rotating said scraper to remove foreign material from the tray surface during movement of a tray by the carriage.

6. In a device of the character described, opposite tracks positioned at an angle to the horizontal, a tray support carriage slidable on said tracks, means for reciprocating said carriage on said tracks, a rotary scraper extending horizontally and cooperatively adjacent to said carriage to engage a tray thereon, means operated by said reciprocating means for retaining a tray on said carriage in engagement with said scraper, and means for rotating said rotary scraper to remove foreign material from the tray surface during movement of a tray by the carriage.

7. In a device of the character described, opposite tracks positioned at an angle to the horizontal, a tray support carriage slidable on said tracks, means for reciprocating said carriage on said tracks, a screw-like scraper extending horizontally and cooperatively adjacent to said carriage to engage a tray thereon, means operated by said reciprocating means and normally engaged with a tray on said carriage during travel of the carriage in one direction for retaining a tray in engagement with said scraper, and means for rotating said scraper to remove foreign material from the tray surface during movement of a tray by the carriage.

8. In a device of the character described, a carriage, means supporting said carriage for reciprocating movement between a first tray receiving position and a second tray release position, means for reciprocating said carriage between said first and said second positions, means for abrading a tray surface during movement of the tray by said carriage from said first to said second position, and means operative to force said tray into engagement with said abrading means only during carriage movement from the first to the second position.

9. In a device of the character described, opposite tracks positioned at an angle to the horizontal, a tray support carriage slidable on said tracks, means for reciprocating said carriage on said tracks back and forth between a first and a second position, means on said carriage for supporting a tray during movement of the carriage from the first to the second position and for releasing the supported tray upon the carriage attaining the second position, a screw-shaped scraper extending horizontally and cooperatively adjacent to said carriage to engage a tray thereon, said scraper being positioned adjacent to the limit of movement of the carriage at said second position, and means for rotating said scraper to remove foreign material from the tray surface during movement of a tray by the carriage.

DAVID A. SANDERS.
GERHARD K. SCHRADER.